United States Patent
Trebouet

(10) Patent No.: US 10,752,171 B2
(45) Date of Patent: Aug. 25, 2020

(54) DEVICE FOR CLEANING A MOTOR VEHICLE DRIVING AID CAMERA

(71) Applicant: Valeo Systèmes d'Essuyage, Le Mesnil Saint Denis (FR)

(72) Inventor: Marcel Trebouet, Le Mesnil Saint Denis (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/256,423

(22) Filed: Jan. 24, 2019

(65) Prior Publication Data

US 2019/0152395 A1    May 23, 2019

Related U.S. Application Data

(63) Continuation of application No. 14/878,228, filed on Oct. 8, 2015, now Pat. No. 10,232,774.

(30) Foreign Application Priority Data

Oct. 10, 2014   (FR) ...................................... 14 59716

(51) Int. Cl.
*B60R 1/00* (2006.01)
*B60R 11/04* (2006.01)
*H04N 5/225* (2006.01)
*B60S 1/52* (2006.01)
*B60S 1/56* (2006.01)
(Continued)

(52) U.S. Cl.
CPC ................ *B60R 1/00* (2013.01); *B60R 11/00* (2013.01); *B60R 11/04* (2013.01); *B60S 1/528* (2013.01); *B60S 1/56* (2013.01); *G02B 27/0006* (2013.01); *H04N 5/2251* (2013.01); *B60R 2011/004* (2013.01); *H04N 5/2254* (2013.01)

(58) Field of Classification Search
CPC combination set(s) only.
See application file for complete search history.

(56) References Cited

U.S. PATENT DOCUMENTS

2013/0048036 A1    2/2013   Jonas

FOREIGN PATENT DOCUMENTS

| CN | 103448684 A | 12/2013 |
|---|---|---|
| DE | 102008008656 A1 | 8/2009 |

(Continued)

OTHER PUBLICATIONS

First Office Action in corresponding Chinese Application No. 201510887512.9, dated Nov. 27, 2018 (17 pages).

*Primary Examiner* — Janese Duley
(74) *Attorney, Agent, or Firm* — Osha Liang LLP

(57) ABSTRACT

A cleaning device for cleaning a lens of a motor vehicle camera using a cleaning head, which includes hydraulic drive members that drive the camera or the cleaning head. The hydraulic drive members are able to generate a relative longitudinal displacement of the cleaning head with respect to the camera between a passive position in which the cleaning head is positioned outside of the image-capturing field of the camera and an active position in which the cleaning head extends facing the lens so as to allow cleaning liquid to be ejected towards the lens. The hydraulic drive members include a chamber in which a piston secured to the camera or to the cleaning head slides under the effect of the pressure of a liquid circulating between a first orifice and a second orifice which are formed respectively in the chamber.

20 Claims, 2 Drawing Sheets

(51) Int. Cl.
*B60R 11/00* (2006.01)
*G02B 27/00* (2006.01)

(56) References Cited

FOREIGN PATENT DOCUMENTS

FR 2567087 A3 1/1986
WO 2012138455 A1 10/2012

DEVICE FOR CLEANING A MOTOR VEHICLE DRIVING AID CAMERA

The invention relates to the field of driving aids and notably to the cameras installed on certain vehicles. More particularly, the invention relates to a device for cleaning such a camera so as to optimize the quality of the driving-aid information supplied to the driver.

Certain motor vehicles are now fitted with image-capturing means, particularly cameras, to assist the driver notably in parking and/or reversing manoeuvres. It will be appreciated that the clearer the image acquired by these image-capturing means, the more useful will be the information supplied to the driver.

The present invention falls within this context and has the objective of proposing a camera cleaning device that is particularly effective. To this end, one subject of the invention is a cleaning device for cleaning a lens of a motor vehicle camera using a cleaning head, characterized in that it comprises drive means for driving the camera or the cleaning head, which are able to generate a relative longitudinal displacement of the cleaning head with respect to the camera between a passive position in which the cleaning head is positioned outside of the image-capturing field of the camera, and an active position in which the cleaning head extends facing the lens so as to allow cleaning liquid to be ejected towards the said lens.

In one preferred embodiment of the invention, provision is made for the cleaning head or the camera to move, one with respect to the other in a longitudinal direction, i.e. substantially along the optical axis of the camera. The drive means are arranged so as to bring about a relative longitudinal displacement of the cleaning head with respect to the camera in such a way that in the passive position the cleaning head lies longitudinally ahead of the lens whereas in the active position the head lies longitudinally away from the camera, behind the lens.

What is meant here by "behind" and "ahead of" are positions defined with respect to the optical axis of the camera and with respect to the direction of image capture. When the camera is a reversing camera, positioned at the rear of the vehicle and facing in such a way as to film a road scene situated behind the vehicle, the team "behind" means that the head is positioned closer to the rear of the vehicle than the camera, and it will be appreciated that if the camera were positioned at the front of the vehicle, the term "behind" would mean that the head is positioned closer to the front of the vehicle than the camera.

According to various features of the invention, considered alone or in combination:
  the camera comprises an objective at the end of which the said lens is positioned, and the cleaning head has a shape that complements the said objective so that it can be positioned around the objective in the said passive position; the cleaning head has an axis that coincides with an axis of the objective and of the lens;
  the objective of the camera has a circular cross section and the cleaning head has an annular shape of dimensions able to fit with overlap around the objective;
  a liquid supply pipe is provided and is connected to the cleaning head, which further comprises an internal face provided with a plurality of nozzles via which the cleaning liquid can leave the head bound for the lens in the said active position;
  the internal face is inclined with respect to the plane perpendicular to the axis of the annular cleaning head so that the nozzles are oriented in such a way as to eject the liquid toward the axis of the annular cleaning head.

According to another group of features, the cleaning device comprises guide means for guiding the longitudinal displacement of the camera or of the cleaning head. The guide means may be borne by the drive means and may consist of a rod secured to the drive means and of a sleeve positioned to project from the camera or from the cleaning head and in which the said rod is able to slide.

According to one advantageous series of features, considered alone or in combination with one another and with the features described hereinabove, provision may also be made for the drive means that drive the cleaning head or the camera to be hydraulic. In this context, the drive means comprise a chamber in which a piston secured to the camera or to the cleaning head is able to slide under the effect of the pressure of a liquid circulating between a first and a second access which are formed in the said chamber, the said piston being returned to its position by a spring housed in the said chamber. The first access may be connected to a liquid supply pipe and the second access may be connected to a separate supply pipe connected to the other end of the cleaning head. It is advantageous for the liquid applying pressure to the piston and displacing the camera or the cleaning head to be the cleaning liquid that is subsequently used for cleaning the lens.

In a preferred embodiment of the invention, the drive means are secured to the camera which is able to follow the displacement generated by the said drive means whereas the cleaning head remains fixed. It will be appreciated that it would, however, be possible to plan for the drive means to be secured to the cleaning head which is able to follow the displacement generated by the said drive means whereas the camera remains fixed.

The invention also relates to a motor vehicle comprising a camera cleaning device as described previously.

In one preferred embodiment of the invention, the camera that can be cleaned by the said cleaning device is a reversing camera positioned at the rear of the vehicle and oriented to capture images of the road scene extending to the rear of the vehicle. The invention thus finds a particularly advantageous, although nonexclusive, application in the field of motor vehicle parking aids.

In instances in which the cleaning device makes provision for the camera to be moved with respect to the cleaning head, the latter is rendered fixed with respect to the structure of the motor vehicle so that it lies substantially flush with the exterior bodywork of the vehicle. The camera is then rendered mobile between a passive position set back from the cleaning head and an active image-capturing position in which the lens positioned at the end of the camera is also flush with the exterior bodywork.

The invention finally relates to a method for cleaning a motor vehicle camera, in which method the said camera is cleaned by ejecting liquid from a cleaning head, and in which first of all, a displacement instruction is generated to make the camera or the cleaning head move from a passive position in which the cleaning head is outside the field of the camera into an active position in which the cleaning head faces the camera, and then an ejection instruction is generated to make the cleaning head eject liquid when this head is in the said active position.

According to one advantageous feature of this method, provision may be made for the displacement instruction and the ejection instruction to be performed by a same instruction to circulate cleaning liquid in a hydraulic circuit which successively makes the camera or the cleaning head move and then makes the cleaning head positioned at the end of the hydraulic circuit eject liquid.

Other features and advantages of the present invention will become more clearly apparent through the description and drawings among which:

Figure 1:
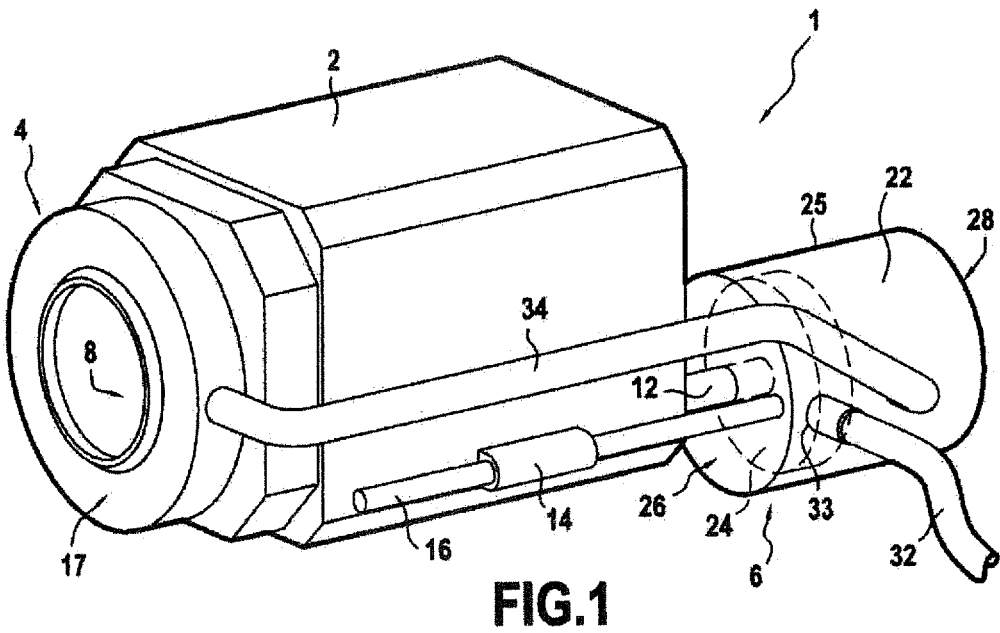
FIG. 1 is a three-quarters front perspective view of a cleaning device according to the invention, in a passive position in which a cleaning head of the device is positioned around a camera of this device, so as not to impede the capturing of images by the camera.
Figure 2:
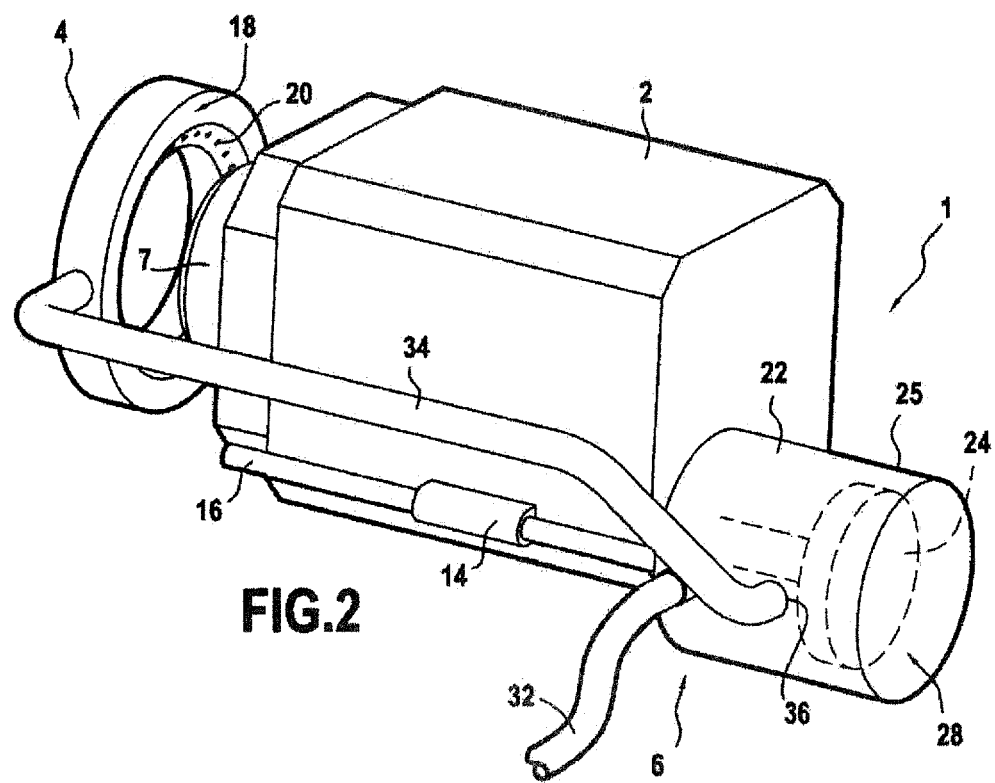
FIG. 2 is a three-quarters rear perspective view of the cleaning device of FIG. 1, this time in an active position in which the cleaning head is able to eject liquid onto the lens of the camera.
Figure 3:
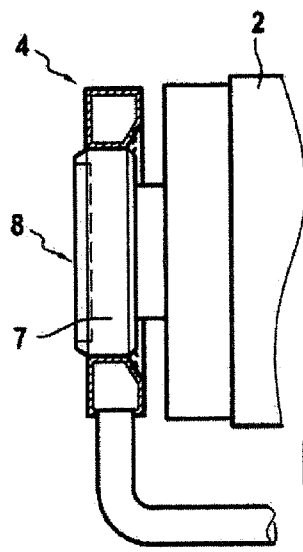
Figure 4:
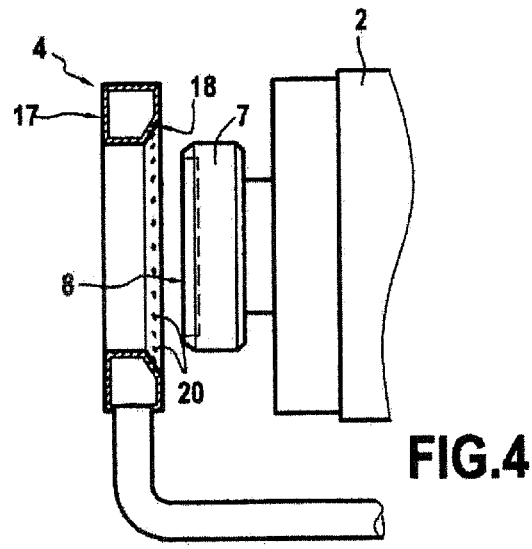
Figure 5:
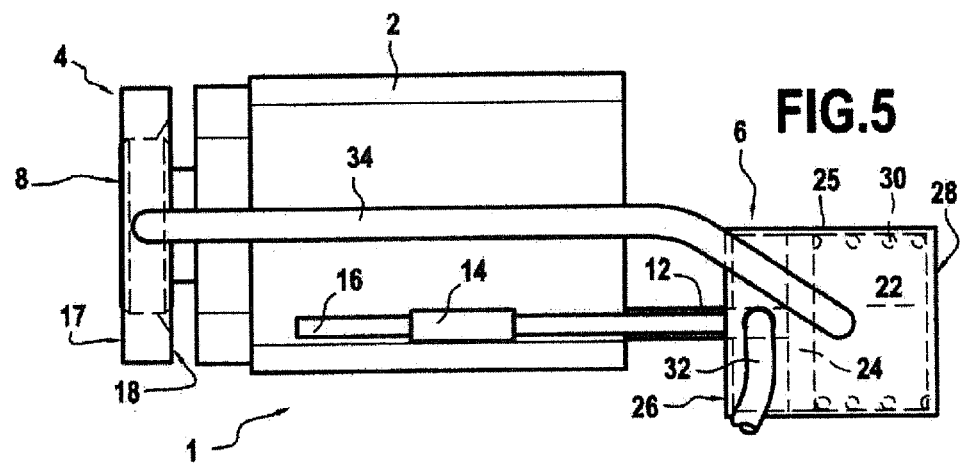
Figure 6:
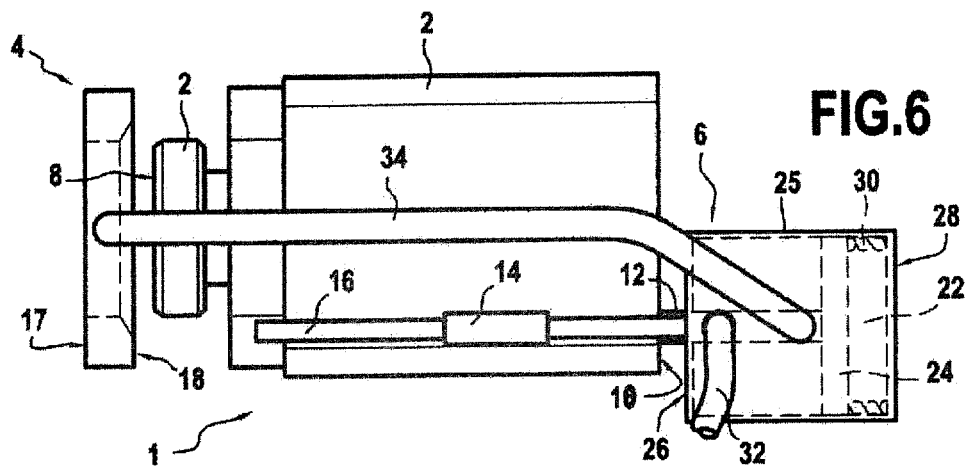

FIGS. 3 and 4 are detailed perspective views of the cleaning head and of the spray nozzles it comprises, in the passive position of FIG. 1, and in the active position of FIG. 2, respectively; and FIGS. 5 and 6 are side views of the cleaning device as previously illustrated and in which a piston that allows the cleaning head to be moved is rendered visible in dotted line, FIG. 5 illustrating the device in the passive position of FIG. 1 whereas FIG. 6 illustrates the device in the active position of FIG. 2.

A cleaning device 1 according to the invention notably comprises a camera 2 and a cleaning head 4, as well as translational-drive means (6) able to generate a relative displacement of the camera with respect to the cleaning head, between a passive position (visible in FIG. 1) in which the head is retracted around the camera so as not to impede the capture of images and an active position (visible in FIG. 2) in which the cleaning head is away from the camera so that it extends facing the lens and allows the lens-cleaning function.

In the following illustrated embodiment, the drive means 6 are connected directly to the camera so that the relative displacement between the camera and the cleaning head is brought about by moving the camera. In this embodiment, it is advantageous to provide for the camera and the cleaning head to be installed in the structure of the vehicle in such a way that the end of the camera that allows image capture and the face of the cleaning head that faces toward the outside of the vehicle are positioned substantially flush with the exterior bodywork of the vehicle when the camera is to capture images of the road scene, in this instance when the cleaning device is in what is referred to as the passive position.

The camera 2 forms a means of capturing images of a road scene situated anywhere around the vehicle and advantageously behind the vehicle so as to provide the driver with information when the driver is reversing. The camera at one longitudinal end, in this instance the end facing towards the rear of the vehicle, comprises an objective 7 taking the form of a cylinder of circular cross section and which at its free end has a lens 8 that needs to be cleaned, at prescribed regular intervals, or before each use of the reversing camera.

The camera further comprises a mounting plate 10 for connecting a translational-drive shaft 12 positioned at the output of the drive means 6. The drive shaft is thus secured to the camera and the longitudinal translational movements thereof generate the corresponding longitudinal movements of the camera.

The camera also comprises, as may be seen in FIGS. 1 and 2, at least one sleeve 14 which is positioned laterally protruding from the camera so as to have a bore that extends longitudinally to accept a guide rod 16 secured to the drive means. Complementary longitudinal guide means, not depicted here, borne by the structure of the vehicle could equally be provided, so as to bear the weight of the camera as it moves longitudinally.

The cleaning head 4 has an annular shape, the axis of which coincides with the axis of the objective of the camera, and the internal diameter of which is slightly greater than the external diameter of the objective 7, so that it can surround the latter in the passive position in which the cleaning head is retracted and positioned around the objective so as not to lie in the field of image capture of the camera, in front of the lens.

The cleaning head has an external longitudinal end face 17 oriented towards the outside of the vehicle and an internal longitudinal end face 18, oriented towards the front of the vehicle in the arbitrary direction chosen in the figures and facing towards the camera when the device is in what is referred to as the active position visible in FIG. 2.

The external end face is depicted as being flat here but it will be appreciated that it plays no part in the cleaning function and that, therefore, it could have a different shape notably so as to fit the space in the structure of the vehicle around the camera and lie flush with the exterior bodywork of the vehicle and/or to allow the cleaning head the greatest possible amount of travel in the space allowed.

The internal longitudinal end face 18 comprises spray nozzles 20 which are arranged all around the periphery of the head. The nozzles are arranged at regular intervals, the number of nozzles and the spacing between each nozzle being left for the manufacturer to determine. The nozzles are arranged in a circle around the axis of the cleaning head, and it will be appreciated that the circle formed by the nozzles has a diameter greater than the diameter of the lens because the internal face of the head that bears them is able to adopt a passive position around the objective bearing the lens. As a result, the nozzles and the internal face are arranged in such a way that the nozzles are orientated to eject the liquid, when the device is in the active position, inwards, namely towards the axis of the annular cleaning head. According to the embodiment illustrated, the said internal face comprises a plane that is inclined with respect to the plane perpendicular to the axis of the annular cleaning head, thereby forming a cone portion, and the nozzles are arranged so that they eject liquid perpendicular to the internal face.

The translational-drive means 6 are able to make the camera move away from and closer to the cleaning head. One particularly advantageous embodiment in which the drive means are hydraulic and in which it is the cleaning liquid that also acts as the pressurizing liquid of the hydraulic system will now be described. Other possible embodiments of these drive means will be detailed as alternatives hereinafter.

In the case illustrated, the drive means notably comprise a chamber 22 in which a piston 24 secured to a link rod that forms the translational-drive shaft 12 as described hereinabove is able to slide.

The chamber 22 consists of a hollow cylinder, formed by a circular wall 25 and delimited longitudinally by a first wall referred to as a proximal wall 26, facing towards the camera, and by a second wall referred to as a distal wall 28. The proximal wall 26 is pierced at its centre for the passage of the link rod 12 that connects the camera to the piston housed inside the chamber. Sealing means are provided between this opening in the proximal wall and the link rod so as not to allow liquid present in the chamber to escape. The piston 24 is housed in the chamber and has the form of a disc of dimensions that complement those of the circular wall, being slightly smaller so as to allow it to slide in the chamber without, however, liquid being able to circulate between the piston and the circular wall.

A spring 30 of the spiral spring type, visible in FIGS. 5 and 6, is positioned between the distal wall 28 and that face 31 of the piston that faces towards this distal wall. The spring is loaded in such a way that it tends to push the piston towards the proximal wall.

As can be seen in FIGS. 1 and 2 for example, two pipes are connected to the chamber 22 of the drive means. A first pipe 32, referred to as the chamber liquid supply pipe, opens into the chamber at a first orifice 33 made in the circular wall of the chamber and positioned near the proximal wall. A second pipe 34 referred to as a cleaning head liquid supply pipe connects this cleaning head to the chamber at a second orifice 36, likewise made in the circular wall of the chamber, longitudinally aligned with the first orifice and positioned substantially in the middle of the chamber.

The drive means further comprise, as may have been mentioned beforehand, a guide rod 16 that extends longitudinally projecting from the proximal wall of the chamber and has a diameter such that this rod can be housed in the sleeve secured to the camera. The longitudinal dimension of the rod is such that it cannot escape from the sleeve whether the device is in the active or passive position. This longitudinal dimension will be calculated notably according to the travel of the piston in the chamber of the drive means.

The cleaning device of the invention will be described first of all in a passive position, notably with reference to FIGS. 1 and 5. In this passive position, the cleaning head 4 is positioned around the objective 7 of the camera, set back from the lens 8, so as not to lie in the field of view of the camera. The head therefore does not impair the quality of image capture and the driving assistance provided to the driver.

The spring 30 housed inside the chamber 22 pushes the piston 24 into a first extreme position in which the piston is as close as possible to the proximal end wall. In this first extreme position, the piston is as far to the rear as possible according to the direction chosen arbitrarily in the figures and the camera, secured to the piston by the drive shaft 12 and the connecting plate 10 is therefore also as far as possible towards the rear, the objective of the camera and the lens at the end thereof being pushed inside the housing defined by the annular shape of the cleaning head, lying flush with the bodywork of the vehicle in which the device is installed.

The passive position is stable provided that the liquid injected into the chamber 22 by the first orifice 33 does not generate enough pressure to cause the piston to move against the return force of the spring 30.

Operation of the cleaning device to make it move into an active position will now be described notably with the support of the illustrations that are FIGS. 2 and 6.

When a situation in which the reversing camera may potentially be used is detected, for example when the clutch is engaged or alternatively when the prescribed period of time between regular cleanings has elapsed, a control module causes liquid to be sent into the chamber 22 via the first orifice 33 using the supply pipe 32. The liquid creates pressure on the piston 24 by filling the chamber and pushes the piston in the direction that moves it away from the proximal wall. The longitudinal movement of the piston towards the front of the chamber, according to the chosen orientation in the figures, causes the simultaneous movement of the camera 2 towards the front of the vehicle, disengaging from the cleaning head 4 which itself remains fixed.

The liquid pushes against the piston, compressing the spring 30, and the part of the chamber that becomes filled with liquid, between the proximal wall 26 and the moving piston, continues to increase, at least until the liquid reaches the second orifice 36. The liquid can then exit via this second access. When the liquid present in the chamber is discharged in part by the second orifice, the piston 24 finds itself in a position of equilibrium between, on the one hand, the pressure applied by the spring 30 and, on the other hand, the pressure applied by the quantity of water which is in balance as regards the liquid entering via the first access and the liquid leaving via the second access. The piston tends to revert to its initial place and forces the liquid to discharge via the second access, expelling it towards the cleaning head via the supply pipe. The pressure applied to the liquid in the supply pipe 34 by this piston return effect ejects liquid at the outlet of the spray nozzles 20 at sufficient speed to sweep away dirt and correctly clean the lens 8.

It will be noted that, advantageously, according to the embodiment described, the cleaning liquid that will be sprayed onto the lens is used beforehand as liquid for regulating the hydraulic pressure in order to cause the relative displacement of the camera and of the cleaning head and in order to make the cleaning device pass from the passive position into the active position. It is therefore the same liquid that is used first of all as a pressurizing liquid and is then used subsequently, when its hydraulic-pressure-regulating action has allowed the cleaning device to be positioned in the desired active position, as a cleaning liquid by being ejected towards the lens at the cleaning head, which is located at the end of the hydraulic circuit in which the cleaning liquid circulates and which passes in succession through the chamber of the drive means and through the cleaning head.

When the cleaning device is to be returned to the passive position, notably so that the camera can capture images without the cleaning head being in the field of view, the control module generates an instruction to cut the supply of liquid to the chamber. The spring 30 then pushes the piston 24 into its original position against the proximal wall 26, discharging the rest of the liquid present in the chamber via the first access, so that liquid remains present in the supply pipe ready for immediate use when the cleaning device needs once again to be moved into the active position. The return of the piston to its original position against the proximal wall causes the camera at the same time to move towards the cleaning head.

The foregoing description explains clearly how the invention is able to achieve the stated objectives and notably the objective offering a cleaning device in which a cleaning head is able correctly to clean the lens of a camera, notably a reversing camera, while at the same time creating a passive position in which this head does not impede the capturing of images by the camera, the cleaning device needing to allow the transition advantageously from this passive position to the active cleaning position to be effected easily and with minimum movement.

Of course, various modifications may be made by those skilled in the art to the structures of the cleaning device that have just been described by way of nonlimiting example provided that relative displacement of an image-capturing camera for assisting with driving a vehicle with respect to a cleaning head is allowed, so as to move from a passive position in which the head and the camera are grouped together into an active position in which they are separated from one another to facilitate the jet of liquid from the head towards the lens of the camera. The embodiment that has been described in detail hereinabove does not impose limits on the invention. In any event, the invention must not be limited to the embodiment specifically described in this document and in particular extends to all equivalent means and any technically feasible combination of these means.

Thus, alternative embodiments that have not been depicted are provided for and some of these are described hereinabove, although this list is not in any way exhaustive:

provision may be made for the drive means to comprise an electric motor which brings about the relative translational movement of the camera and of the cleaning head, while an independent supply circuit supplies cleaning liquid to the cleaning head when the device is in the active position;

provision may be made for the drive shaft of the drive means to be secured to the cleaning head rather than the camera and for the longitudinal translational movements of the piston and of the drive shaft to generate corresponding longitudinal movements of the cleaning head. It will be appreciated that, in this case, rather than seeking to move the camera longitudinally towards the rear, it is the cleaning head that will be moved longitudinally forwards, with the same ultimate objective of making the head uncover the camera and allowing cleaning liquid to be ejected from the spray nozzles of the head towards the lens of the camera;

provision may be made for the conditions initiating cleaning of the camera lens to be distinct, and notably for the liquid to be carried towards the cleaning head at the same time as the vehicle rear screen is being cleaned.

The invention claimed is:

1. A cleaning device for cleaning a lens of a camera for a motor vehicle using a cleaning head, comprising:

hydraulic drive members that drive the camera or the cleaning head, the hydraulic drive members being configured to generate a relative longitudinal displacement of the cleaning head with respect to the camera between a passive position in which the cleaning head is positioned outside of an image-capturing field of the camera, and an active position in which the cleaning head extends facing the lens so as to allow a cleaning liquid to be ejected towards the lens, wherein the hydraulic drive members comprise a chamber in which a piston secured to the camera or to the cleaning head slides under the effect of the pressure of a liquid circulating between a first orifice and a second orifice which are formed respectively in the chamber, wherein the first orifice is connected to a liquid supply pipe and the second orifice is connected to a separate supply pipe connected to another end of the cleaning head, and wherein the chamber consists of a hollow cylinder formed by a circular wall and wherein at least the second orifice is made in the circular wall.

2. The cleaning device according to claim 1, wherein the liquid applying pressure to the piston and displacing the camera or the cleaning head is the cleaning liquid that is used for cleaning the lens.

3. The cleaning device according to claim 1, wherein the first orifice and the second orifice are made in the circular wall.

4. The cleaning device according to claim 3, wherein the first orifice and the second orifice are aligned parallel to a direction of the relative longitudinal displacement of the cleaning head.

5. The cleaning device according to claim 1, wherein the piston is returned to an original position by a spring housed in the chamber.

6. The cleaning device according to claim 1,
wherein the hydraulic drive members are disposed so as to bring about the relative longitudinal displacement of the cleaning head with respect to the camera such that in the passive position the cleaning head lies longitudinally ahead of the lens, whereas in the active position the cleaning head lies longitudinally away from the camera, behind the lens, and wherein when the camera is a reversing camera, "ahead of" means the cleaning head is positioned farther to a rear of the vehicle than is the camera, and "behind" means the cleaning head is positioned closer to the rear of the vehicle than is the camera; and when the camera is a forward camera, "ahead of means the cleaning head is positioned farther to a front of the vehicle than is the camera, and "behind" means the cleaning head is positioned closer to the front of the vehicle than is the camera.

7. The cleaning device according to claim 1,
wherein the camera comprises an objective at an end of which the lens is disposed, and wherein the cleaning head comprises a shape that complements the objective so that the cleaning head is able to surround the objective in the passive position in which the cleaning head is retracted and positioned around the objective, the cleaning head having an axis that coincides with an axis of the objective and an axis of the lens.

8. The cleaning device according to claim 7, wherein the objective of the camera has a circular cross section and wherein the cleaning head has an annular shape of dimensions able to fit with overlap around the objective.

9. The cleaning device according to claim 8, further comprising the liquid supply pipe connected to the cleaning head, which further comprises an internal longitudinal end face provided with a plurality of nozzles via which the cleaning liquid can leave the head bound for the lens in the active position.

10. The cleaning device according to claim 9, wherein the internal longitudinal end face is inclined with respect to a plane perpendicular to an axis of the annular cleaning head so that the nozzles are oriented in such a way as to eject the liquid toward the axis of the annular cleaning head.

11. The cleaning device according to claim 1, further comprising guide members that guide a longitudinal displacement of the camera or a longitudinal displacement of the cleaning head.

12. The cleaning device according to claim 11, wherein the guide members are borne by the hydraulic drive members.

13. The cleaning device according to claim 12 wherein the guide members consist of a rod secured to the hydraulic drive members and a sleeve positioned to project from the camera or from the cleaning head, and wherein the rod is able to slide.

14. The cleaning device according to claim 1, wherein the hydraulic drive members are secured to the camera which is able to follow a displacement generated by the hydraulic drive members whereas the cleaning head remains fixed.

15. The cleaning device according to claim 1, wherein the hydraulic drive members are secured to the cleaning head which is able to follow a displacement generated by the hydraulic drive members whereas the camera remains fixed.

16. A motor vehicle comprising the cleaning device according to claim 1 for cleaning the camera.

17. The motor vehicle according to claim 16, wherein the camera that is cleaned by the cleaning device is a reversing camera positioned at the rear of the vehicle and oriented to capture images of a road scene extending to the rear of the vehicle.

18. A motor vehicle comprising:
the cleaning device that cleans the camera according to claim 14,
wherein the cleaning head is rendered fixed with respect to a structure of the motor vehicle so the cleaning head lies flush with an exterior bodywork of the vehicle, the camera being rendered mobile between the passive position set back from the cleaning head and an active image-capturing position in which the lens positioned at the end of the camera is also flush with the exterior bodywork.

19. A method for cleaning a motor vehicle camera, comprising:
cleaning the camera by ejecting a liquid from a cleaning head;
generating a displacement instruction to make the camera or the cleaning head move from a passive position in which the cleaning head is outside a field of the camera into an active position in which the cleaning head faces the camera; and
generating an ejection instruction to make the cleaning head eject the liquid when the head is in the active position,
wherein a movement of the camera or the cleaning head is a longitudinal translational movement,
wherein drive members that drive the cleaning head or the camera are hydraulic, the hydraulic drive members comprising a chamber in which a piston secured to the camera or to the cleaning head slides under the effect of the pressure of a liquid circulating between a first orifice and a second orifice which are formed respectively in the chamber,
the chamber consisting of a hollow cylinder formed by a circular wall, wherein at least the second orifice is made in the circular wall.

20. The method according to claim 19, wherein the displacement instruction and the ejection instruction are performed by a same instruction to circulate a cleaning liquid in a hydraulic circuit which successively makes the camera or the cleaning head move and then makes the cleaning head positioned at an end of the hydraulic circuit eject the liquid.

* * * * *